US008527197B2

(12) United States Patent
Poncelet born Morey

(10) Patent No.: US 8,527,197 B2
(45) Date of Patent: Sep. 3, 2013

(54) CONTROL DEVICE FOR ONE OR MORE SELF-PROPELLED MOBILE APPARATUS

(75) Inventor: Michele Poncelet born Morey, Fonsorbes (FR)

(73) Assignee: Nav on Time, Toulouse (FR)

( * ) Notice: Subject to any disclaimer, the term of this patent is extended or adjusted under 35 U.S.C. 154(b) by 404 days.

(21) Appl. No.: 12/995,695

(22) PCT Filed: May 22, 2009

(86) PCT No.: PCT/FR2009/050952
§ 371 (c)(1),
(2), (4) Date: Dec. 2, 2010

(87) PCT Pub. No.: WO2009/156631
PCT Pub. Date: Dec. 30, 2009

(65) Prior Publication Data
US 2011/0142099 A1    Jun. 16, 2011

(30) Foreign Application Priority Data

Jun. 2, 2008 (FR) ...................................... 08 03004

(51) Int. Cl.
*G01S 5/00* (2006.01)
(52) U.S. Cl.
USPC ............................................. 701/412; 37/348
(58) Field of Classification Search
USPC .................. 701/50; 414/697, 699; 172/2, 4, 172/4.5, 5; 37/348, 395, 397, 414, 415, 907
See application file for complete search history.

(56) References Cited

U.S. PATENT DOCUMENTS

| 6,088,644 A * | 7/2000 | Brandt et al. .................... 701/50 |
| 6,112,143 A | 8/2000 | Allen et al. |
| 6,128,574 A | 10/2000 | Diekhans |
| 8,214,111 B2 * | 7/2012 | Heiniger et al. ................ 701/50 |
| 2005/0027406 A1 | 2/2005 | Nonami et al. |
| 2006/0214845 A1 | 9/2006 | Jendbro et al. |

FOREIGN PATENT DOCUMENTS

| EP | 0522829 A2 | 1/1993 |
| WO | 9912793 A | 3/1999 |

OTHER PUBLICATIONS

International Search Report, dated Oct. 16, 2009, from corresponding PCT application.

* cited by examiner

*Primary Examiner* — Dalena Tran
(74) *Attorney, Agent, or Firm* — Young & Thompson

(57) ABSTRACT

A device for controlling self-propelled mobile apparatus(es) (300), includes:—a stationary base station (200), provided with a receiver for a satellite location system, referred to as a stationary GNSS receiver, and a radiofrequency transmitter/receiver to enable communication with at least one mobile apparatus, and including: a positioning module, a command module, and a control module for controlling the movement of each mobile apparatus on the ground;—at least one mobile apparatus (200), including a moving element, a mobile GNSS receiver, and a radiofrequency transmitter/receiver for transmitting, to the base station (200), information received by the mobile GNSS receiver and receiving a movement command.

20 Claims, 2 Drawing Sheets

CONTROL DEVICE FOR ONE OR MORE SELF-PROPELLED MOBILE APPARATUS

The invention relates to a control device for one or more self-propelled mobile apparatus, and more particularly to a device implementing the positioning by satellites of a mobile apparatus (or of multiple mobile apparatus) with a view to the control and, if need be, to the coordination of their displacements.

In the agricultural domain, tractors or other heavy vehicles making use of positioning by satellite, for example making use of the satellite system called GPS (Global Positioning System), are known in order to improve the guidance of the heavy vehicles when they are working in fields.

For example, document U.S. Pat. No. 6,128,574 describes a process for planning and optimising the route of an agricultural vehicle using the differential GPS, in which the position errors inherent in the GPS system are corrected through the use of a fixed base placed in a known position. The vehicle includes a first receiver for receiving the GPS signals, enabling it to calculate its position, and a second receiver for receiving a position correction emitted by the fixed base. The vehicle also includes a computer making it possible for its steering mechanisms to be controlled as a function of its corrected position and as a function of a strategy for travelling over the terrain, prepared in advance and recorded in the computer. However, the electronic means on board these vehicles are heavy, highly energy-consuming and extremely expensive and are justified only because the vehicles themselves are very costly.

For mobile apparatus of reduced size and cost, a self-propelled golf caddy is known from document WO 99/12793 which includes an on-board computer containing a map of the golf course and rules for navigation on said golf course. The caddy uses the differential GPS for the determination of its position. In situations where this determination may be compromised, however, use has to be made of other guiding means such as buried cables or even the hand of a man. Despite the simplification of the on-board electronics in comparison with agricultural vehicles, this caddy remains excessively costly.

In the remainder of the description the term GNSS (Global Navigation Satellite System) will be used in order to designate a satellite positioning system in general, this acronym encompassing any complete constellation, such as GPS (USA), GLONASS (Russia), GALILEO (Europe), COMPASS (China) and their current and future expansions EGNOS (Europe), WAAS (USA), MSAS (Japan), GAGAN (India).

Therefore there remains a need for a control device for one or more self-propelled mobile apparatus that enables a simplification of the electronics on board the mobile apparatus while preserving and improving the autonomy of the device, in order to avoid human intervention as far as possible.

In addition, when a mass consumer market—such as autonomous lawnmowers, for example—is envisaged, it is necessary to obtain these advantages at a reasonable cost and without requiring too unwieldy an implementation, such as the burying of cables, in order to guide or limit the displacement of the mobile apparatus. Moreover, it is advantageous, if not necessary, to retain a broad possibility for modification of the routes and behaviours of these mobile apparatus, which is not allowed by a solution calling for a rigid infrastructure such as buried cables.

In order to do this, the invention relates to a control device for one or more self-propelled mobile apparatus, including a fixed base station equipped with a receiver of a satellite positioning system, called a fixed GNSS receiver, and with a radio-frequency transceiver suitable to communicate with at least one mobile apparatus; at least one mobile apparatus, including a power source, displacement means, a receiver of a satellite positioning system, called a mobile GNSS receiver, and a radio-frequency transceiver suitable to communicate with said base station; memory means containing data representative of the topographical definition of a terrain travelled over by at least one mobile apparatus and of the position of the base station in, or in the vicinity of, said terrain. The control device is characterised in that each mobile apparatus is suitable to transmit information, called raw GNSS information, to the base station that is representative of the content and of the characteristics of the satellite signals received by its mobile GNSS receiver, and to receive a displacement command, and in that the base station includes:

a module, called a set-point module, including said memory means and suitable to work out a strategy for travelling over the terrain by said one or more mobile apparatus as a function of the topographical definition of the terrain and as a function of parameters of a task to be accomplished by the mobile apparatus,
 a module, called a positioning module, suitable to calculate an instantaneous position of said mobile apparatus from the raw GNSS information transmitted by the mobile apparatus, from the information representative of the content and of the characteristics of the satellite signals received by the fixed GNSS receiver, and from the position of the base station and,
 a module, called a control module, suitable to determine a command for displacement of the mobile apparatus as a function of at least the instantaneous position of said apparatus and as a function of the travelling strategy worked out by the set-point module, and to transmit said displacement command to said mobile apparatus.

Thus with a device according to the invention the mobile apparatus no longer has to carry out all the calculations that the mobile apparatus of the prior art needed. The calculations of the GNSS position, of the correction of said position, and the determination of the displacement command are no longer processed in the mobile apparatus but by the base station which may be equipped with calculation means that are more powerful and much less costly, since they no longer need to be on board the mobile apparatus. Likewise, the data representative of the terrain travelled over by the mobile apparatus and the task parameters are no longer duplicated in each of them but are centralised in the base station, thus simplifying updates. For this reason, the electronics on board the mobile apparatus are simpler, lighter, more reliable. They consume less electrical power, and so the autonomy of the power source on board the mobile apparatus is enhanced.

Advantageously and in accordance with the invention, the control device includes, in addition, an apparatus for logging the topographical definition of the terrain, including a GNSS receiver, a transceiver suitable to communicate with the base station, and at least one switch suitable to control the execution of a logging of the position of the logging apparatus by the base station. The logging apparatus may be a specific, portable device or one of the mobile apparatus including means appropriate to control an operation of said mobile apparatus as a logging apparatus, to inform the base station thereof, and to control the execution of a logging of its position by the base station. The topographical definition of the terrain may thus be established by a logging on the spot, using means that are identical or very similar to those which will be used in operation. Thus the map of the terrain may be more precise than that which could be made from a cadastral survey or from an aerial photograph, without excluding these means, on their own or in combination with a logging obtained by the logging apparatus.

Advantageously and in accordance with the invention, the topographical definition of the terrain includes several distinct zones, and the control module is suitable to take defined displacement rules into account in the task parameters for each of the zones. The displacement of the mobile apparatus can thus be prohibited or limited under certain conditions in particular zones.

Advantageously and in accordance with the invention, each mobile apparatus includes at least one actuator capable of carrying out various jobs, and the control module transmits to the mobile apparatus an indicator of the job to be carried out with the displacement command. For example, in combination with the zones previously defined, a mobile apparatus having lawnmower functions could be capable of mowing in accordance with various heights of grass, or along orthogonal axes (horizontally and/or vertically), in order to delimit borders.

Advantageously and in accordance with the invention, the base station includes means for connection to a data-processing network and a server that is programmed to enable, locally or remotely, the establishment and the updating of the topographical definition of the terrain or of the task parameters as well as the maintenance of the device. The base station may thus be connected up to the domestic network of the owner of the terrain, who therefore has the possibility of visualising the state of the system and, if need be, of modifying certain parameters. In addition, the domestic network may be connected to the Internet and may also enable a service-provider to access the base station and the whole of the device remotely in order to modify the parameters thereof or to carry out the maintenance thereof.

Advantageously and in accordance with the invention, the base station includes, in addition, branching means cooperating with conjugate branching means carried by each mobile apparatus and suitable to ensure the recharging of the power source of the mobile apparatus, and the travelling strategy worked out by the set-point module takes account of a state of said power source in order to optimise the displacements of the mobile apparatus. This practical arrangement enables the base station to manage the charging of the power source on board the mobile apparatus, particularly if it is a question of batteries requiring a particular monitoring of charge, and to prevent a mobile apparatus from being immobilised with power failure far from the base station, thus requiring the intervention of a human operator.

Advantageously and in accordance with the invention, the means for displacement of the mobile apparatus include two independent lateral drive wheels placed on either side of an axis of displacement of the mobile apparatus, each one driven by an electric motor, and in that the displacement command emitted by the base station includes a power command applied to each motor. Thus the electronics on board the mobile apparatus can be minimised.

Advantageously and in accordance with the invention, the mobile apparatus includes sensors suitable to detect the presence of obstacles in its near environment and means suitable to transmit information relating to the presence of obstacles to the base station. The mobile apparatus includes, in addition, local control means reacting to the presence of obstacles, in order to apply a safety strategy. Proximity sensors such as ultrasonic sensors or even contact sensors thus make it possible to ensure safety in the vicinity of the mobile apparatus, said apparatus being able to detect an obstacle, for example an animal, and to implement locally a safety strategy such as total and immediate stop or an avoidance by modification of the displacement in progress. The presence of obstacles is transmitted to the base station simultaneously with the GNSS information of the mobile apparatus, thus enabling the base station to 'learn' the position of the obstacles and to modify the paths of future routes in order to avoid them.

Advantageously and in accordance with the invention, the set-point module of the base station is suitable to update the topographical definition of the terrain as a function of the obstacles detected by the mobile apparatus. Obstacles exhibiting a certain character of permanence can thus be recorded in the topographical definition of the terrain and taken into account in the elaboration of the strategy for travelling over the terrain that is applied by the mobile apparatus.

Advantageously and in accordance with the invention, the control device includes a plurality of mobile apparatus, and the base station is suitable to calculate the position of each mobile apparatus and to coordinate the displacement commands to be applied by each mobile apparatus. Thus a single base station can control the displacements of several mobile apparatus. In this way, duplicating costly electronic means in each mobile apparatus is avoided. In addition, the base station calculating the position of each mobile apparatus is able to coordinate their displacements in relation to one another and enable the execution of the task at an optimised overall cost.

Advantageously and in accordance with the invention, the positioning module of the base station is suitable to detect a degradation of the satellite signal received by a mobile GNSS receiver from the raw GNSS information transmitted by said receiver and to transmit, in return, commands for adjustment of said receiver. Thus when the conditions for reception of the satellite signals are altered at the place of the position of the mobile apparatus, for example by reflections entailing multiple paths of the signal and therefore discontinuities of the position calculated from the raw GNSS information of the mobile apparatus, the base station takes advantage of the similarity of its receiver to that of the mobile apparatus in order to define which is the valid signal and to force the tuning of the receiver of the mobile apparatus to said signal.

Advantageously and in accordance with the invention, the positioning module of the base station is suitable to calculate an uncertainty of positioning affecting the position of a mobile apparatus from the raw GNSS information transmitted by said apparatus, and to modify the transmitted displacement command as a function of this uncertainty. Thus as a function of the number and the position of the satellites received by the receiver of the mobile apparatus the base station is capable of estimating a possible position error of said apparatus. If this error is significant, the displacement command that will be sent to the mobile apparatus will take it into account, for example by commanding a large displacement in order to leave the disturbed zone if the mobile apparatus is far from a boundary of the terrain, or by limiting the displacement in order to avoid any crossing of a boundary.

Advantageously and in accordance with the invention, the mobile apparatus of the device according to the invention is a lawnmower. In this way, an autonomous mowing system is obtained enabling large spaces such as golf courses to be processed. Other applications of the control device according to the invention may be considered; for example, the sweeping of paths in a park, the surveillance of open-air warehouses such as in harbour areas, etc.

The invention also relates to a control device for one or more self-propelled mobile apparatus, which is characterised in combination by all or some of the characteristics mentioned above or below.

Other aims, characteristics and advantages of the invention will become apparent in the light of the description which follows and in the light of the appended drawings in which:

FIG. 1 represents a schematic view of a terrain 100 in which a control device for one or more self-propelled mobile apparatus according to the invention has been installed. In the description which follows, the control device for one or more mobile apparatus will be described by referring to an example utilising a lawnmower (lawnmowers) 300 as mobile apparatus.

Figure 2:
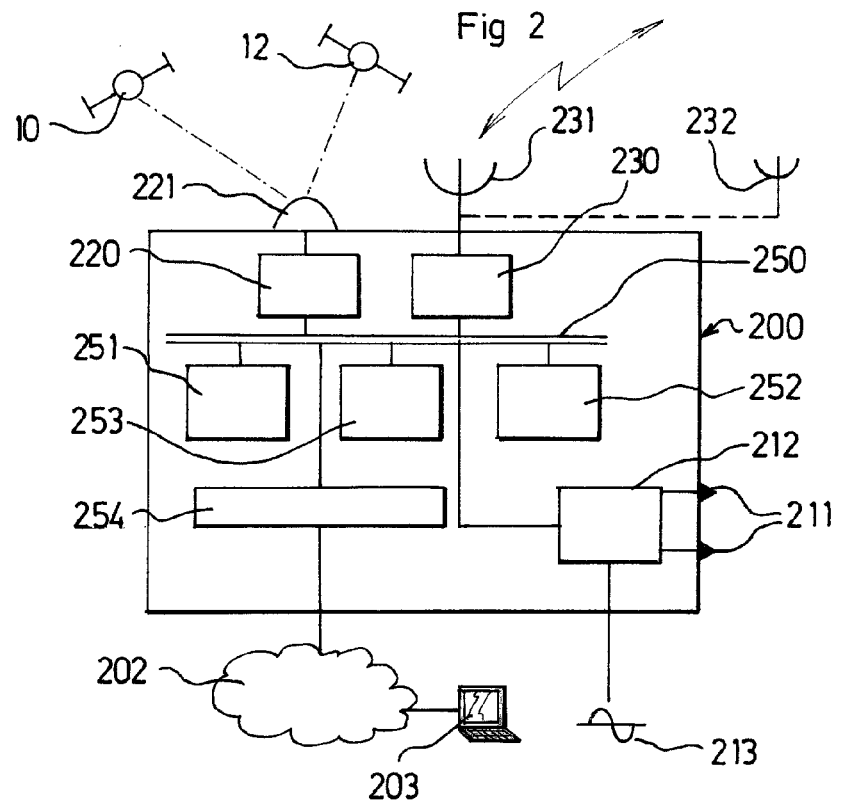
FIG. 2 represents a schematic view of the base station according to the device of the invention.

The device includes a fixed base station 200, represented in more detail in FIG. 2, including a receiver of a satellite positioning system, called a fixed GNSS receiver 220, linked with an antenna 221. The fixed GNSS receiver 220 is suitable to receive signals originating from a constellation of satellites 10, 11, 12 and 13. For each of the satellites 10, 11, 12, 13, the signals of which have been correctly received and processed, the fixed GNSS receiver 220 extracts a set of four measurements strictly dated from the instant of measurement (corresponding to an instant of reception of the satellite signals) in the time-frame of the GNSS system being used. These measurements are:

- the code pseudo-range representative of the satellite/receiver range contaminated with the clock bias of the receiver and measured in respect of the code servo-controls of the receiver processing
- the phase pseudo-range representative of the satellite/receiver range contaminated with the clock bias of the receiver and measured in respect of the carrier servo-controls of the receiver processing
- the 'integrated Doppler' representative of the pseudo-range increment between two successive measurements in respect of the carrier servo-controls of the receiver processing
- a measurement of the signal-to-noise ratio of the receiving channel of the satellite being considered.

This information will be called raw GNSS information in the following.

The base station 200 includes, in addition, a radio-frequency transceiver 230, for example a transceiver suitable to transmit and receive data within the frequency band reserved for industrial, scientific and medical applications, such as a WIFI™ transceiver. This transceiver is linked with one or more antennas 231, 232 making it possible to cover the terrain 100 without the signal being masked by buildings, for example.

The base station includes various modules: a module 251, called a positioning module, suitable to calculate the position of each mower 300 in the terrain by using raw GNSS information originating from each mower, a module 252, called a set-point module, suitable to define and record the topographical definition of the terrain, parameters of the task to be accomplished by each mower, and also to work out a strategy for travelling over the terrain by said mowers, and a module 253, called a control module, suitable to control the displacement of each mower in the terrain. The detailed operation of these modules will be described in the following in relation to the overall operation of the control device of the invention. Of course, these various modules which will be described by their functional aspect may be realised with data-processing means such as a microcontroller, an associated bus for commands and data, RAM, ROM memories, etc. These data-processing means, known in themselves, are linked with data-processing programs that are capable of being realised by a person skilled in the art starting from the functional description of the various modules.

The base station 200 also includes a data-processing server 254 and means for connection 201 to a local area network 202, thus enabling a terminal 203 linked to this network to have access to the resources and information contained in the station. The local area network 202 may also be connected to the Internet 30, so that an authorised external intervening party, for example the installer of the device, can access the control device, and in particular the base station 200, from a workstation 31 linked to the Internet. In this way it is possible to carry out the maintenance of the device remotely, whether it be to load updated software into it or to intervene in data descriptive of the terrain or of the task to be executed.

The base station 200 is also linked to a network for supplying electrical power 213 by means of a power pack 212. The power pack 212 also includes branching means 211 intended to cooperate with conjugate branching means 311 carried by the mower 300, in order to undertake the recharging of the power source on board the mower.

The base station 200 is placed in the terrain 100 in a position having absolute geographical coordinates (longitude and latitude) that are known as precisely as possible. It will be noted, nevertheless, that this position can be estimated by the fixed GNSS receiver 220 and refined by a filtering in respect of the repeated measurements carried out. This position serves as reference for all the calculations requiring knowledge of the absolute geographical coordinates, such as the calculations for estimating the distance to the satellite, etc.

This position is recorded in a memory which is part of the set-point module 252 in the base station 200. The set-point module 252 also includes data in its memory that are representative of the topographical definition of the terrain 100.

Figure 1:
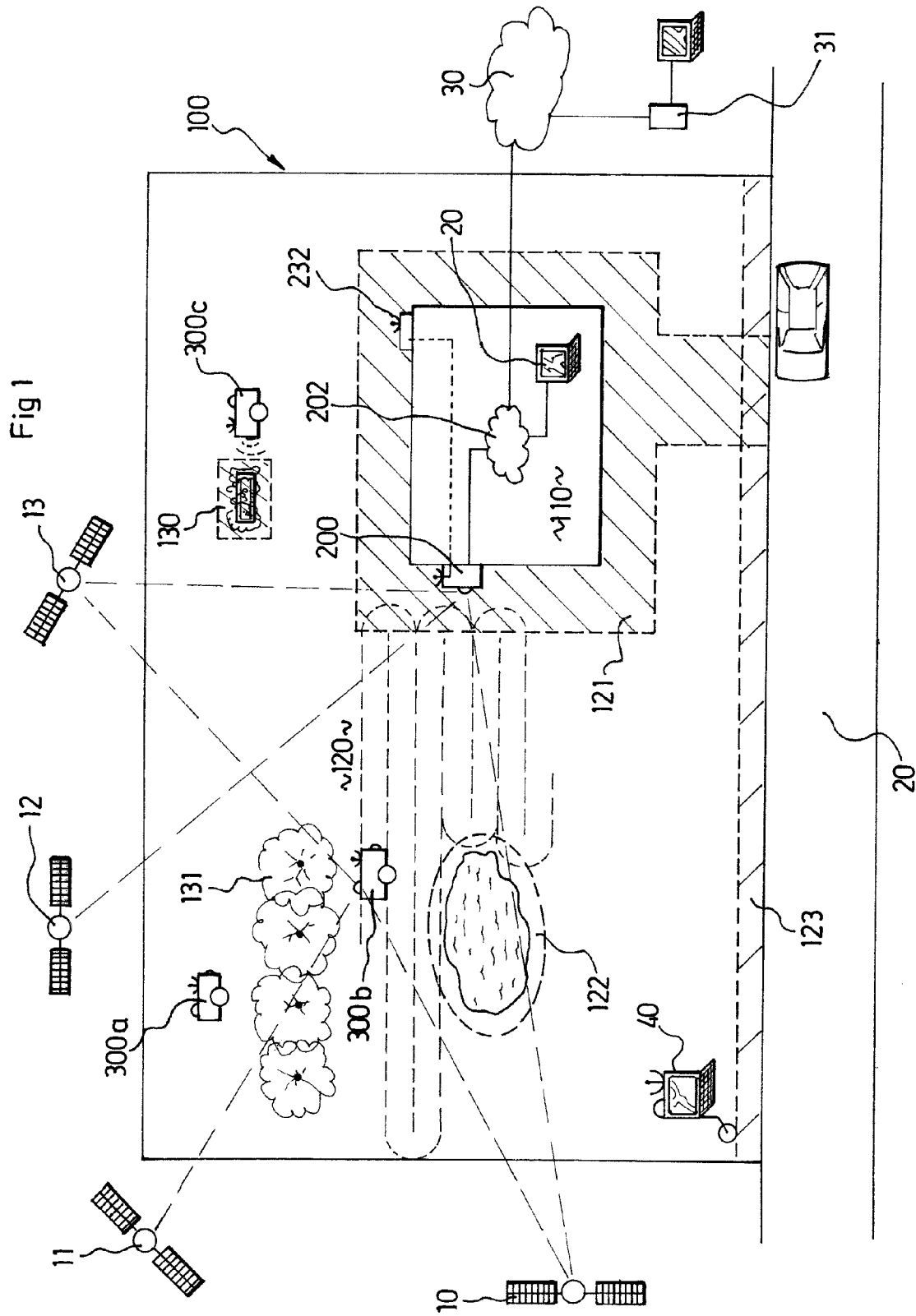
FIG. 1 represents a schematic view of a terrain equipped with a device according to the invention.

This topographical definition may be very simple and may include only the geographical coordinates of the four corners of a rectangular terrain, or it may be more complex and include multiple zones such as in the example represented in FIG. 1. For example, the terrain 100 includes a main zone 120, a path 121 around a main part of a building 110, an approximately elliptical zone 122 corresponding to an ornamental lake, for example, and a zone 123 forming a narrow band along the boundary of the terrain 100 running alongside a road 20. These various zones are defined by data representing the geographical coordinates of their boundaries and recorded in the memory of the set-point module 252.

It will, of course, be understood that the reference to geographical coordinates has to be understood as referring to absolute or relative coordinates. Indeed, as will be seen in the following, the invention makes use of the differential GNSS, the reference of which is the base station 200. Thus any geographical coordinate relating to the terrain 100 or to a zone of said terrain may advantageously be expressed in relative coordinates in relation to the position of the base station 200.

Each of these zones corresponds to a distinct processing by a lawnmower 300. For example, zone 120 has to be mowed in normal manner, whereas zone 121 is permitted only for a displacement of the mower, without mowing action; zone 122 corresponds to a prohibited zone of passage, because the mower cannot cross an ornamental lake; zone 123 can only be travelled over longitudinally, parallel to the axis of the road 20 which it borders, in order to avoid encroaching outside the boundaries of the terrain, in particular onto the road 20. The set of these displacement rules is recorded in the memory of the set-point module 252 in the form of data constituting, at least in part, the parameters of the task of the mobile apparatus.

Figure 3:
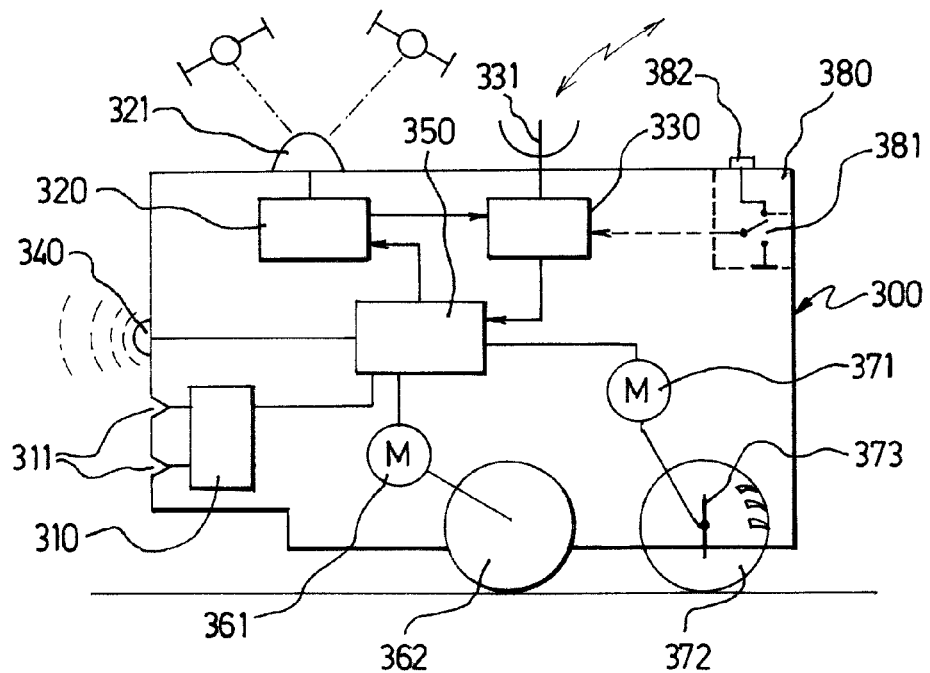
FIG. 3 represents a schematic view of a mobile apparatus according to the device of the invention.

The device also includes mobile apparatus or lawnmowers 300a, 300b, 300c travelling over the terrain 100. Each mower 300, described in more detail in FIG. 3, includes a receiver of a satellite positioning system, called a mobile GNSS receiver 320, linked with an antenna 321. The mobile GNSS receiver 320 is also suitable, in a manner analogous to the fixed GNSS receiver 220 of the base station, to extract raw GNSS information from the satellite signals received. The mobile GNSS receiver 320 is suitable to transmit the raw GNSS information to a radio-frequency transceiver 330 which transmits it, in turn, destined for the base station 200 by means of an antenna 331. The radio-frequency transceiver 330 is, for example, a transceiver suitable to transmit and receive data within the frequency band reserved for industrial, scientific and medical applications, such as a WIFI™ transceiver.

The radio-frequency transceiver 330 is suitable to communicate with the transceiver 230 of the base station, and receives from said transceiver a displacement command which it transmits to a mobile control module 350.

The mower 300 also includes displacement means such as a pair of independent lateral drive wheels 362 placed on either side of its displacement axis, and an electric drive motor 361 that is appropriate for each of the wheels 362. Other wheels (not represented) are provided, in order to ensure the stability of the mower.

The mower 300 includes, in addition, at least one actuator capable of carrying out various jobs. In this case, the mower 300 includes a helical mowing blade 372 including means 373 for adjusting the height of cut, driven by an electric motor 371. The electric motors 361 and 371 as well as the on-board electronics are supplied with power by a power source, in this case a battery 310. The mower 300 includes branching means 311 linked to the battery 310, cooperating with conjugate branching means 211 carried by the base station 200 and suitable to ensure the recharging of the battery 310.

The mobile control module 350 is suitable to control at least the motors 361 for driving the displacement means, and, if need be, the motor 371 for driving the cutting means.

The mower 300 also includes at least one sensor 340, linked to the mobile control module 350, that is suitable to detect the presence of obstacles in its near environment. The sensor 340 may be, by way of example, an ultrasonic proximity sensor or an infrared-radiation proximity sensor, or a contact sensor, such as a switch linked to a flexible skirt around the machine, etc.

The control device according to the invention also includes a logging apparatus 40 making it possible to carry out a logging of the topographical definition of the terrain. This logging apparatus includes a GNSS receiver, a radio-frequency transceiver suitable to communicate with the base station, and at least one switch suitable to control the execution of a logging of the position of the apparatus by the base station. The logging of position is carried out, for example, by means of the raw GNSS data transmitted by the GNSS receiver of the logging apparatus 40 via the radio-frequency transceiver, destined for the positioning module 251 of the base station 200 in order to be processed there, and by recording said data in the set-point module 252.

The logging apparatus is displaced within the boundary of the terrain or zone, and at each point a logging of the position of the apparatus is carried out by the base station at the request of the logging apparatus. The logging of position may also be carried out continuously by displacing the logging apparatus 40 along the zone frontiers. As soon as it is obtained, the raw GNSS information thus logged is transmitted to the base station 200.

The logging apparatus may be constituted by a suitably equipped portable computer.

If such a logging apparatus is justified for a provider having to configure numerous terrains, one may, however, observe that a mower 300 also includes means such as the GNSS receiver and the transceiver which are analogous to those of the logging apparatus 40. Because of this, a mower 300 may advantageously be used as a logging apparatus, for example by the owner, for minor modifications of the topographical definition of the terrain.

To this end, at least one mower 300 also includes an optional module, called a logging module 380. This module includes means appropriate to control an operation of the mower as a topographical logging apparatus, making it possible to carry out the topographical definition of the terrain. For example, the logging module 380 includes a switch 381 that is appropriate to inform the base station 200 of the operation of the mower 300 in logging mode, and a push-button 382 which, when it is actuated, controls the execution by the base station 200 of a logging of the position of the mower. When the mower 300 is operating as a logging apparatus it is manually displaced to the boundaries of the terrain 100 and/or of the various zones, and a series of loggings of position is carried out. These loggings are stored in the set-point module 252 of the base station for verification, editing and processing, starting from a terminal 203 linked to the local area network 202 or from a remote workstation 31.

The topographical definition of the terrain may, of course, be carried out by other means, for example by using a cadastral survey or aerial photographs, insofar as said means include a referencing in relation to the geographical coordinates (longitude and latitude) or insofar as coordinates relating to the position of the base station can be extracted, and by carrying the coordinates of the zone boundaries across into a list of data representative of the topographical definition of the terrain.

The topographical definition of the terrain is recorded in memory means which are part of the set-point module 252. Each zone of the topographical definition of the terrain is accompanied by task parameters describing, inter alia, the type of displacement that can be carried out by the mower 300 in the zone being considered. From these data the set-point module 252 works out a strategy for travelling over the terrain, taking into account a certain number of parameters for optimisation of the displacement of the mower or mowers, such as, for example, the width of cut that the mower can carry out, the autonomy of its battery, etc.

By way of example, in FIG. 1 an elementary travelling strategy applied to mower 300b is represented by fine dashes, consisting in a sweeping of zone 120 parallel to the major axis of the terrain 100, with a sweeping step equal to the width of cut, and limited by the boundaries of zones 121 and 122 encountered on this route.

Advantageously, seeing that the base station 200 includes branching means 211 enabling the recharging of the battery 310 of the mower, the set-point module 252 works out a travelling strategy that is appropriate to bring the mower 300 close to the base station when the charge of the battery reaches a minimum threshold. This makes it possible to minimise the 'non-productive' displacements of the mower 300. In addition, in the case of a device including several mowers the set-point module is suitable to work out a travelling strategy aiming to bring the mowers in turn into their recharging position.

Of course, such a strategy would find application even if the site of recharging of the battery were dissociated from the base station. Indeed, it is entirely possible to imagine a station for recharging the mowers 300 that is separate from the base station and placed at a different site, such as a storage shed, etc. In this case the position of the recharging station will be stored in the set-point module, and the latter will establish travelling strategies aiming to cause the mower 300 to pass close to the recharging station at a useful time.

In operation, the mobile GNSS receiver 320 of each mower 300 receives a signal from satellites 10, 11, 12, 13 and retransmits the raw GNSS information that it extracts therefrom to a positioning module 251 of the base station 200. This transmission is carried out by the sending of a digital message, called a position message, by the radio-frequency transceiver 330, destined for the radio-frequency transceiver 230 of the base. This message includes digital data representative of the identity of the mower 300 (when the same base station 200 is linked with a plurality of mobile apparatus such as the mowers 300a, 300b and 300c) and of the identity of each satellite, the signal of which is received, followed by the content and the characteristics stemming from the demodulation of this signal by the mobile GNSS receiver 320.

The position message transmitted by the mower 300 may in addition, if need be, include other data fields that are representative of state information of the mower being considered, such as information concerning the remaining charge in the battery 310 or the measurement and/or the state of the sensor 340.

The positioning module 251 carries out calculations of the position of the mower 300 in the terrain starting from the raw GNSS information of the mower, from the raw GNSS information received by the fixed GNSS receiver 220 of the base station, and from the known position of said base station.

The method of calculation of the position that is employed is, for example, that of the differential GNSS, in which the raw GNSS information of the mobile apparatus 300 is corrected from the associated errors estimated by means of the raw GNSS information of the fixed GNSS receiver 220. The corrected measurements are then used for the estimation of the position of the mobile apparatus 300. In preferential manner, the position of the mower will be calculated by means of a technique derived from the so-called GPS-RTK technique, in which the precision of the positioning is improved and may be close to one centimeter.

This technique directly employs the measurement of the phase difference of the carrier frequency of the satellite signals between the mobile GNSS receiver 320 of the mower 300 and the fixed GNSS receiver 220 of the base station 200. After removing ambiguity (that is to say, determination of the number of entire carrier periods which separate the measurements of the two receivers, satellite channel by satellite channel), carried out in accordance with methods known to a person skilled in the art in a context where the distance between the fixed base and the mower is short, a precise evaluation is attained in the three dimensions of the coordinates of the mobile in a reference system, the fixed base of which is the origin.

The positioning module 251 of the base station is also suitable to detect a degradation of the satellite signal received by a mobile GNSS receiver 320. Indeed, in the case of satellite signals affected by multiple paths an instability of the position measurement can be ascertained. In this case the positioning module 251 is suitable to compare the raw GNSS information received by the mower with the information received by the fixed GNSS receiver of the base station. The positioning module 251 can deduce therefrom a new adjustment to be adopted by the mobile GNSS receiver of the mower, in order to eliminate interference signals. The positioning module 251 is also suitable to provide GNSS parameters to the mobile GNSS receiver that improve the times of acquisition and/or re-acquisition of the signals, for example ephemerides, including taking account of the dynamics and the characteristics of reception appropriate to the mobile GNSS receiver.

The positioning module 251 is also suitable to estimate an uncertainty of positioning affecting the position of a mobile apparatus that it has just calculated. Indeed, while being displaced in the terrain 100 the mower or mowers 300 may be situated in places in the terrain where certain satellites are likely to be masked by trees or buildings. Likewise, as a function of the orbits of the satellites, some of them may disappear from the direct sight of the fixed GNSS receiver of the base station. If the positioning module has not been able to use raw GNSS information of a sufficient number of satellites, the estimated position may be contaminated with an error. This error may be compared to a radius of a circle, or more exactly to the dimensions in the three axes of an ellipsoid in which the mower 300 is situated. The value of this radius, or of these three dimensions, is also transmitted to the control module 253.

Once the position of the mower 300 has been determined, said position is transmitted to the control module 253. The control module determines a displacement command from this instantaneous position of the mower and from the travelling strategy established by the set-point module 252. The displacement command may be determined, for example, by a course to be followed and a duration of displacement to be executed by the mower 300 or by a number of wheel revolutions determined for each of the wheels.

The displacement command is preferentially transmitted to the control module 350 of the mower 300 via the radio-frequency transceivers 230 and 330 in the form of a control of the power of the motors 361 of the wheels 362 of the mower 300. For example, the control module 253 sends a digital message, called a control message, destined for the mobile control module 350, this digital message including, in the case of a device including several mobile apparatus, the identification of the mower concerned, a value of the power to be applied by a first wheel motor 361, for example in the form of a percentage of the maximum power of the motor 361, a value of the power to be applied by the second motor. In this form, the wheels are driven at constant power by their respective motor. If these motors are adjusted to the same power, the displacement is carried out in a straight line; in the contrary case, the mower performs a rotation on the side of the wheel driven at the lower power. This control is maintained until the next measurement of the position of the mower.

The control message may include, if need be, commands to be applied to the actuators of the mowing blade. For example, in the event of displacement in a zone such as the path 121 where the task parameters compel a displacement without mowing action, the control message will include an indicator in the form of a predefined digital value in a field of the message, indicating to the mobile control module 350 to stop the motor 371 of the mowing blade and to control the height adjustment of the blade to its highest position.

The displacement command is also modified as a function of the quality of the signals received and as a function of the number of satellites taken into account by the positioning module 251. As was seen previously, said module transmits to the control module an uncertainty of positioning affecting the position of the mower 300. The control module 253 then takes this uncertainty into account in order to determine the command to be transmitted to the mobile control module 350. For example, if the horizontal projection of the ellipsoid on the longitudinal axis of mobile is slight, the position is of good quality and the module 253 will be able to control a rapid displacement along this axis. In another example, if the projection on a transverse axis is much better, the module 253 will be able to control a displacement in rotation in order to orient the displacement along this axis. In all cases, and in order to ensure the safety of the task, if the dimensions of the ellipsoid exceed a predetermined threshold, or as a function of the relative position of the mobile within the boundaries of the terrain such as in zone 123 at the edge of the road 20, the control module 253 will slow down or stop the mobile apparatus in order to avoid an untimely excursion of the mower onto the road. In the case of a stop, the calculation of the position of the mobile and of its ellipsoid of uncertainty are realised regularly and monitored in order to restart the mobile automatically, since the geometry and/or the quality of reception of the satellites have naturally improved, resulting in uncertainties that are more suitable to movement. On the contrary, if the mower is distant from any zone presenting a danger or requiring particular attention, the control module 253 will be able to control a rapid displacement, in order to enable the mower 300 to extricate itself from the place where the reception of the satellite signals is disturbed, or not to 'over-correct' apparent drifts of position which could be due only to this uncertainty.

The displacement commands determined in the fixed base station 200 by the control module 253 are transmitted to the mobile control module 350 of the mower 300, which applies them in accordance with two possible modes.

In a first mode of execution of the displacement command, which is applicable, in particular, in the case where the command includes a duration of execution or a distance to be travelled over, the mower 300 executes the command and at the conclusion of the displacement (or just before the end, in order to ensure continuity of the movement) it transmits to the base station a message including the raw GNSS information logged in its new position. In a variant, and particularly when the displacement command covers a long distance (when, for example, the mower is distant from any zone boundary), the mower may be suitable to transmit a position message periodically. This mode of execution presents the advantage that if the radio-frequency link between the base station and the mower is lost, said mower will stop at the end of the controlled displacement.

In a second mode of execution of the displacement command, which is applicable, for example, in the case where the command determined is a command regarding the power of the motors of the wheels, the command is executed as long as the mobile control module 350 does not receive any command modification. In this case it is preferable that the mower be suitable to transmit position messages permanently and that a procedure of the 'watchdog' type be installed, defining a maximum duration during which the mower can be displaced without receiving information from the base station.

Whatever the mode of execution of the displacement commands, it is advisable to provide safety means, implemented directly in the mower, in the event of unexpectedly encountering an obstacle.

To this end, the mower 300 therefore includes at least one sensor 340, for example of the type represented by an ultrasonic proximity sensor, enabling an obstacle at a distance from 10 cm to 1 m to be detected. The mower is preferentially equipped with a plurality of sensors distributed over the whole of its perimeter, in order to detect possible obstacles in all directions. These sensors are linked to the mobile control module 350 which is suitable, on the one hand, to transmit information relating to the presence of obstacles in the position message emitted by the mower, destined for the base station, and, on the other hand, to control an immediate reaction of the displacement means and of the actuators of the mower in accordance with a safety strategy established locally.

Two sorts of obstacles may be considered: so-called transient obstacles, such as persons or animals that are likely to cross the path of the mower and that will disappear from its near environment within a few seconds or perhaps a few minutes, and obstacles exhibiting a certain character of permanence (from a few days to a few weeks and more), such as a flower stand 130, installed in the terrain for the summer season, or a clump of trees 131, the topographical definition of which as a particular zone was not done initially.

An example of a safety strategy established locally in the mobile control module 350 of the mower initially consists in controlling, in a first period, an immediate stop of the displacement and of the actuators, and in verifying the permanence of the presence of the obstacle. If the latter disappears within a brief interval (a few seconds to a few minutes), it is considered as a transient obstacle and signalled as such to the base station. If the obstacle is still present upon expiry of the brief interval, this fact is signalled to the base station 200 in a position message enabling, after processing by the positioning module 251, on the one hand, this position and the information of the presence of an obstacle to be recorded in the set-point module 252, and, on the other hand, a modification of the travelling strategy of the mower being considered to be calculated, by causing it to carry out a change of direction, at a right angle or a U-turn, by an appropriate control message of the control module 253.

Since the space occupied by the obstacle has not been processed (mowed), the set-point module will adapt its travelling strategy in order to take the mower back there. If the obstacle exhibits a character of permanence, the same process will start again, and another point of the perimeter of the obstacle will be recorded in the set-point module 252. Since a sufficient number of points on the perimeter of the obstacle will be recorded in the set-point module 252, the latter can update its topographical definition of the terrain by creating an additional zone, affected by a prohibition of passage (associated task parameter), around the position of the obstacle. This new zone will be able to be validated, or not, by a human intervention at the time of the next maintenance intervention.

To sum up, the operation of the control device for one or more self-propelled mobile apparatus according to the invention may be described as a control process for at least one self-propelled mobile apparatus that is suitable to travel over a terrain and to carry out a predetermined job in said terrain, said mobile apparatus being equipped with a receiver of a satellite positioning system, called a mobile GNSS receiver, and with a radio-frequency transceiver, starting from a fixed base station, itself equipped with a receiver of a satellite positioning system, called a fixed GNSS receiver, and with a radio-frequency transceiver suitable to communicate with that of the mobile apparatus, said process including the following steps:

a) establishment of a topographical definition of a terrain to be processed by the mobile apparatus, including at least one assigned reference position at the base station, b) elaboration of a strategy for travelling over said terrain by each mobile apparatus with a view to the accomplishment of a predetermined task, c) determination of the position of the mobile apparatus in the terrain from satellite positioning data, d) elaboration and execution of a command for displacement of the mobile apparatus.

This control process is distinguished in that the determination of the position of the mobile apparatus is carried out by the base station starting from raw GNSS information received by the mobile GNSS receiver of the mobile apparatus and retransmitted by the latter to the base station, from raw GNSS information received in the same time-interval by the fixed GNSS receiver attached to the base station, and from the reference position of said base station.

Alternatively, or in combination with the characteristic above, step d) of elaboration and execution of a command for displacement of the mobile apparatus is distinguished by the elaboration of the displacement command in a control module forming part of the fixed base station, its transmission in the form of a digital control message by radio channel to a mobile control module on board the mobile apparatus, and its execution by said on-board mobile control module.

The foregoing description as well as the references to the Figures of the appended drawing are given solely by way of illustrative example, and a person skilled in the art will be able to make numerous modifications thereto without departing from the scope of the invention, such as, for example, equipping the mobile apparatus with internal-combustion engines and/or means for controlling the direction of the displacement, such as guiding wheels, distinct or not, of the drive wheels.

Likewise, the control device is not limited to lawnmowers but may be applied to all sorts of self-propelled mobile apparatus, such as sweeping machines, surveillance robots or trucks for materials handling and/or for transport in open-air warehouses, in harbour areas, etc.

The invention claimed is:

1. Control device for one or more self-propelled mobile apparatus, comprising:
    a fixed base station equipped with a fixed satellite positioning system receiver and a radio-frequency transceiver that communicates with at least one mobile apparatus,
    at least one self-propelled mobile apparatus, including a power source, a mobile satellite positioning system receiver, and a radio-frequency transceiver that communicates with said base station,
    a memory containing data representative of a topographical definition of a terrain travelled over by each mobile apparatus and of a position of the base station in, or in the vicinity of, said terrain, wherein,
    each mobile apparatus transmits raw GNSS information to the base station that is representative of contents and of characteristics of satellite signals received by said mobile apparatus' mobile satellite positioning system receiver, and to receive a displacement command from said base station;
    the base station includes:
    a set-point module including said memory and that works out a strategy for travelling over the terrain by said one or more mobile apparatus as a function of the topographical definition of the terrain and as a function of parameters of a task to be accomplished by the mobile apparatus,
    a positioning module that calculates an instantaneous position of said mobile apparatus from the raw GNSS information transmitted by the mobile apparatus, from the information that is representative of the contents and of the characteristics of the satellite signals received by the fixed satellite positioning system receiver, and from the position of the base station, and
    a control module that determines a command for displacement of the mobile apparatus as a function of at least an instantaneous position of said mobile apparatus and as a function of the travelling strategy worked out by the set-point module, and to transmit said displacement command to said mobile apparatus.

2. Control device as claimed in claim 1, further comprising:
    an apparatus for logging the topographical definition of the terrain, including a satellite positioning system receiver, a transceiver that communicates with the base station, and at least one switch that controls execution of a logging of a position of the logging apparatus by the base station.

3. Control device as claimed in claim 2, wherein the at least one mobile apparatus a controller controlling an operation of said mobile apparatus as a logging apparatus, to inform the base station thereof, and to control the execution of the logging of at least one mobile apparatus' position by the base station.

4. Control device as claimed in claim 1,
    wherein the topographical definition of the terrain includes plural distinct zones, and
    wherein the control module takes defined rules for displacement into account in task parameters for each of the distinct zones.

5. Control device as claimed in claim 1,
    wherein each mobile apparatus includes at least one actuator arranged to out various jobs, and
    wherein the control module transmits to the mobile apparatus an indicator of the job to be carried out with the displacement command.

6. Control device as claimed in claim 1, wherein the base station includes a data-processing network connection and a server programmed to enable, locally or remotely, establishment and updating of the topographical definition of the terrain or of task parameters as well as maintenance of the device.

7. Control device as claimed in claim 1,
    wherein the base station includes, in addition, branching part cooperating with a conjugate branching part carried by each mobile apparatus and ensures recharging of the power source of the mobile apparatus, and
    wherein the travelling strategy worked out by the set-point module takes account of a state of said power source in order to optimise displacements of the mobile apparatus.

8. Control device as claimed in claim 1,
    wherein the mobile apparatus further include two independent lateral drive wheels placed on either side of an axis of displacement of the mobile apparatus, each driven by an electric motor, and
    wherein the displacement command emitted by the base station includes a control of the power applied to each motor.

9. Control device as claimed in claim 1, wherein the mobile apparatus further includes sensors that detect a presence of obstacles in the mobile apparatus' near environment and a unit that transmits information relating to the presence of obstacles to the base station.

10. Control device as claimed in claim 9, wherein the mobile apparatus includes, in addition, local control units reacting to the presence of obstacles, in order to apply a safety strategy.

11. Control device as claimed in claim 9, wherein the set-point module of the base station is updates the topographical definition of the terrain as a function of the obstacles detected by the mobile apparatus.

12. Control device as claimed in claim 1,
wherein the control device includes a plurality of said mobile apparatus, and
wherein the base station calculates the position of each mobile apparatus and to coordinate the displacement commands to be applied by each mobile apparatus.

13. Control device as claimed in claim 1,
wherein the positioning module of the base station detects a degradation of the satellite signal received by said mobile satellite positioning system receiver from the raw GNSS information transmitted by said mobile satellite positioning system receiver and to transmit, in return, commands for adjustment of said mobile satellite positioning system receiver.

14. Control device as claimed in claim 1, wherein the positioning module of the base station calculates an uncertainty of positioning affecting the position of a mobile apparatus from the raw GNSS information transmitted by said apparatus and to modify the transmitted displacement command as a function of this uncertainty.

15. Control device as claimed in claim 1, wherein the mobile apparatus is a lawnmower.

16. A control system, comprising:
a self-propelled mobile lawnmower that includes a power source, a displacement motor unit, a receiver of a mobile, satellite positioning system and a radio-frequency transceiver;
a fixed base station equipped with i) a fixed, satellite positioning system receiver and ii) a radio-frequency transceiver that communicates with the lawnmower, the lawnmower being separate from the fixed base station and mobile with respect to the fixed base station,
wherein the lawnmower's radio-frequency transceiver communicates with the radio-frequency transceiver of said base station, the lawnmower transmits raw GNSS information to the base station that is representative of contents and of characteristics of satellite signals received by the lawnmower's satellite positioning system receiver, and to receive a displacement command from said base station,
wherein the fixed base station further includes
i) a memory containing data representative of the topographical definition of a terrain travelled over by each mobile apparatus and of the position of the base station in, or in the vicinity of, said terrain,
ii) a set-point module including said memory and that works out a strategy for travelling over the terrain by the lawnmower as a function of the topographical definition of the terrain and as a function of parameters of a task to be accomplished by the mobile apparatus,
iii) a positioning module that calculates an instantaneous position of the lawnmower from the raw GNSS information transmitted by the lawnmower, from the information that is representative of the contents and of the characteristics of the satellite signals received by the fixed satellite positioning system receiver, and from the position of the base station, and
iv) a control module that determines a command for displacement of the lawnmower as a function of at least an instantaneous position of the lawnmower and as a function of the travelling strategy worked out by the set-point module, and to transmit said displacement command to the lawnmower.

17. The system of claim 16, wherein,
the radio-frequency transceiver of the base station is a WIFI transceiver linked to an antenna covering the terrain.

18. The system of claim 16, further comprising:
an apparatus for logging the topographical definition of the terrain, including a satellite positioning system receiver, a transceiver that communicates with the base station, and at least one switch that controls execution of a logging of a position of the logging apparatus by the base station.

19. The system of claim 16, wherein,
the topographical definition of the terrain includes plural distinct zones, and
the control module takes defined rules for displacement into account in task parameters for each of the distinct zones.

20. The system of claim 16, wherein,
wherein the lawnmower has an actuator that controls mowing in accordance with plural heights of grass, and
the control module transmits to the lawnmower an indicator of a height of grass to be cut to control the actuator to have the lawnmower cut at the indicated height of grass.

* * * * *